United States Patent
Ochi

(10) Patent No.: US 11,635,730 B2
(45) Date of Patent: Apr. 25, 2023

(54) IMAGE FORMING APPARATUS CAPABLE OF CONTROLLING SHEET DISCHARGE ACCORDING TO PRESENCE OR ABSENCE OF USER

(71) Applicant: KYOCERA Document Solutions Inc., Osaka (JP)

(72) Inventor: Makoto Ochi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/706,002

(22) Filed: Mar. 28, 2022

(65) Prior Publication Data

US 2022/0311886 A1   Sep. 29, 2022

(30) Foreign Application Priority Data

Mar. 29, 2021 (JP) .............................. JP2021-055935

(51) Int. Cl.
    *G03G 21/18*    (2006.01)
    *H04N 1/00*     (2006.01)
    *G03G 15/00*    (2006.01)

(52) U.S. Cl.
    CPC ....... *G03G 21/1892* (2013.01); *G03G 15/502* (2013.01); *G03G 15/5012* (2013.01); *G03G 15/5016* (2013.01); *G03G 15/5091* (2013.01); *G03G 15/6508* (2013.01); *H04N 1/00411* (2013.01); *H04N 1/00482* (2013.01); *H04N 2201/0094* (2013.01)

(58) Field of Classification Search
    CPC ........... G03G 15/5012; G03G 15/5016; G03G 15/502; G03G 15/6508; G03G 21/1892; H04N 1/00411; H04N 1/00482; H04N 2201/0094
    See application file for complete search history.

(56) References Cited

U.S. PATENT DOCUMENTS

| 10,021,261 | B2 * | 7/2018 | Tanaka | G06V 40/10 |
| 2019/0332338 | A1 * | 10/2019 | Ikazaki | G06F 3/1268 |
| 2019/0373127 | A1 * | 12/2019 | Tsuji | G06V 40/19 |

FOREIGN PATENT DOCUMENTS

| JP | 2012248035 A | 12/2012 |
| JP | 2017146904 A | 8/2017 |

* cited by examiner

*Primary Examiner* — Joseph S Wong
(74) *Attorney, Agent, or Firm* — IP Business Solutions, LLC

(57) ABSTRACT

In an image forming apparatus, a control device functions as a controller and a user presence/absence determiner. When accepting an instruction to execute a print job through a touch panel, the controller controls operations of a sheet feed device, a conveyance device, and an image forming device to allow a document image represented by image data generated by a document reading device to be formed on a sheet to make a printed matter and allow the printed matter to be discharged to a sheet output tray. When the user presence/absence determiner determines that a user is present, the controller controls, before printing for at least a last sheet in the print job, the operations of the sheet feed device and the conveyance device to allow a sheet to be discharged to the sheet output tray without allowing the image forming device to form the document image on the sheet.

11 Claims, 10 Drawing Sheets

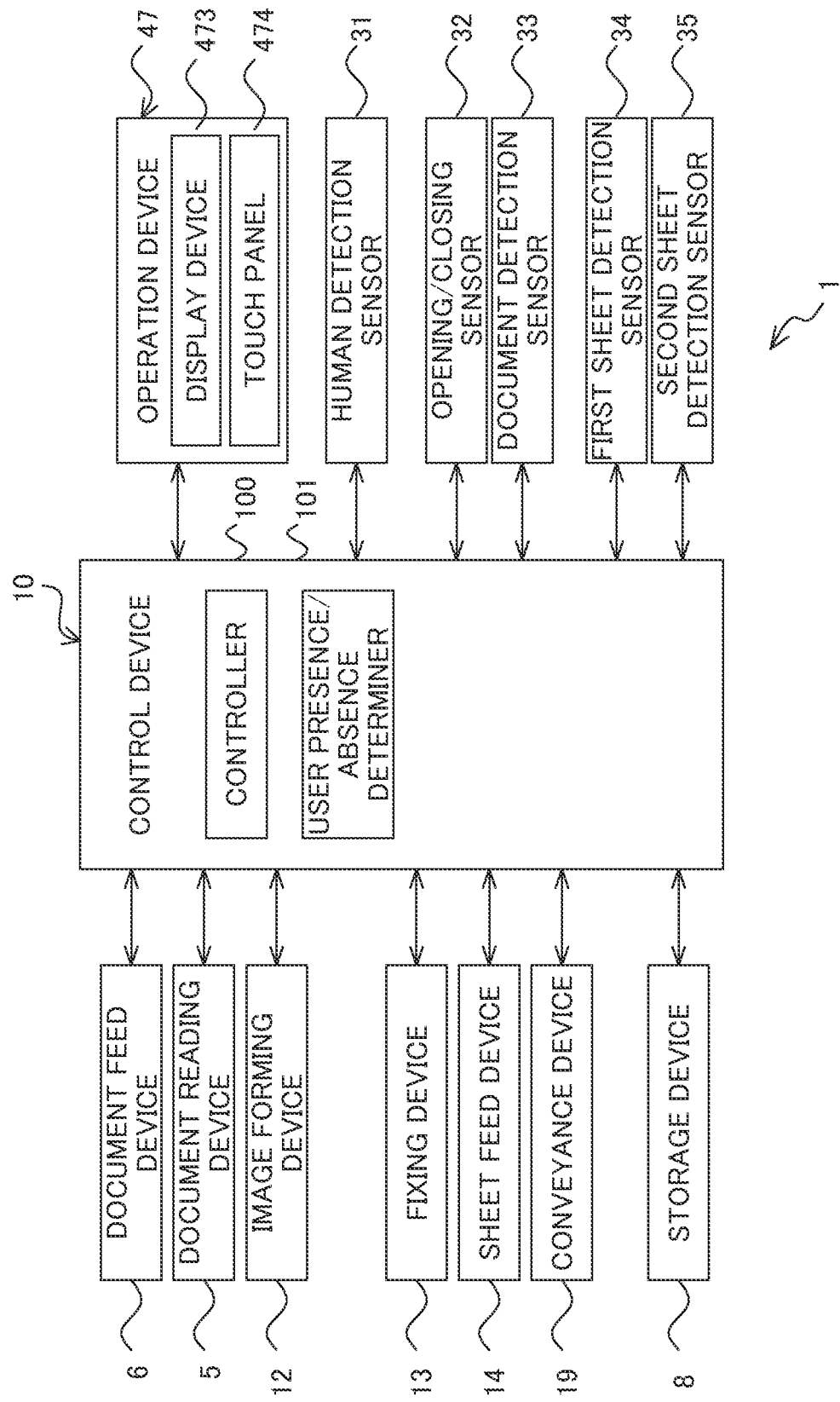

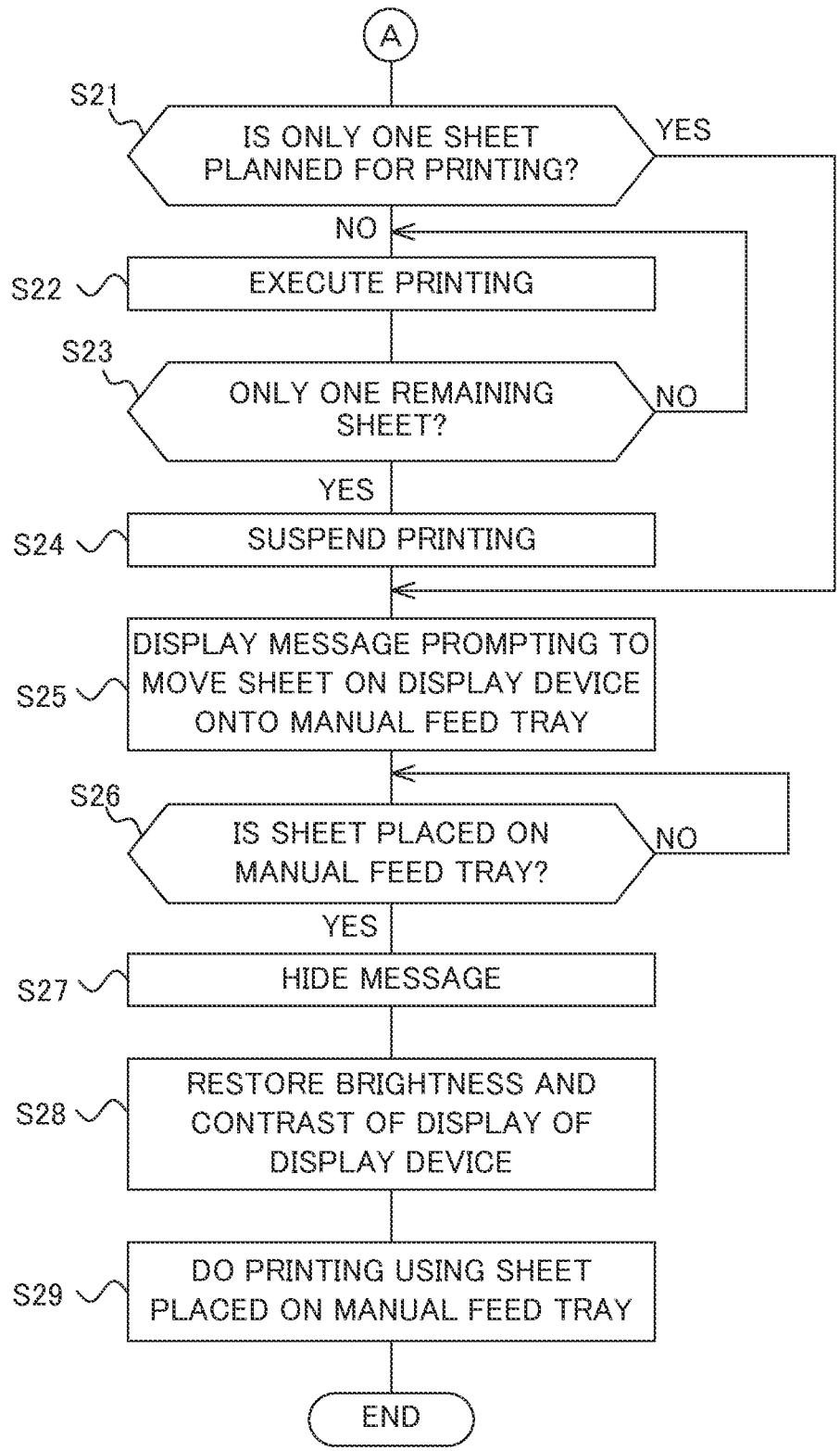

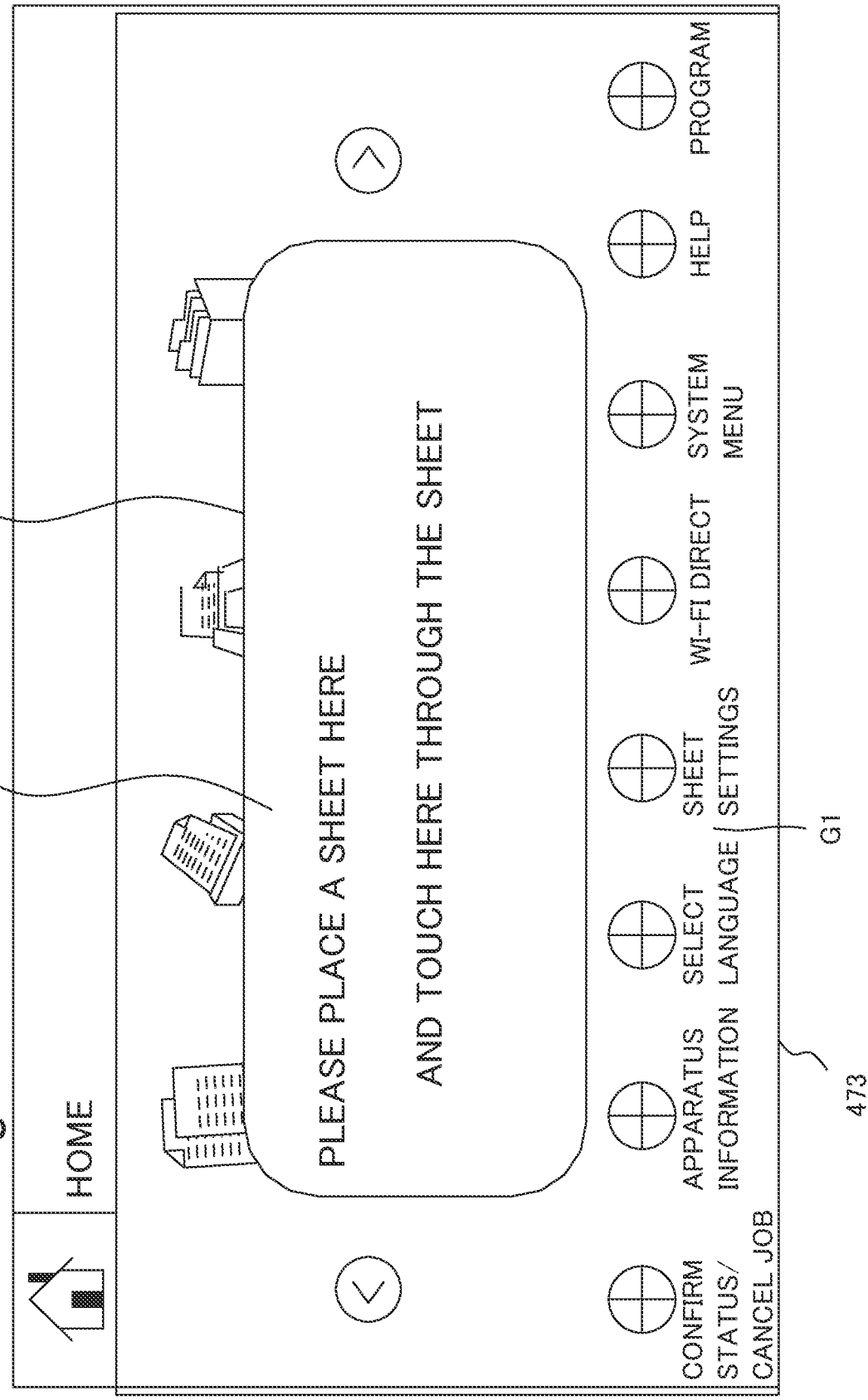

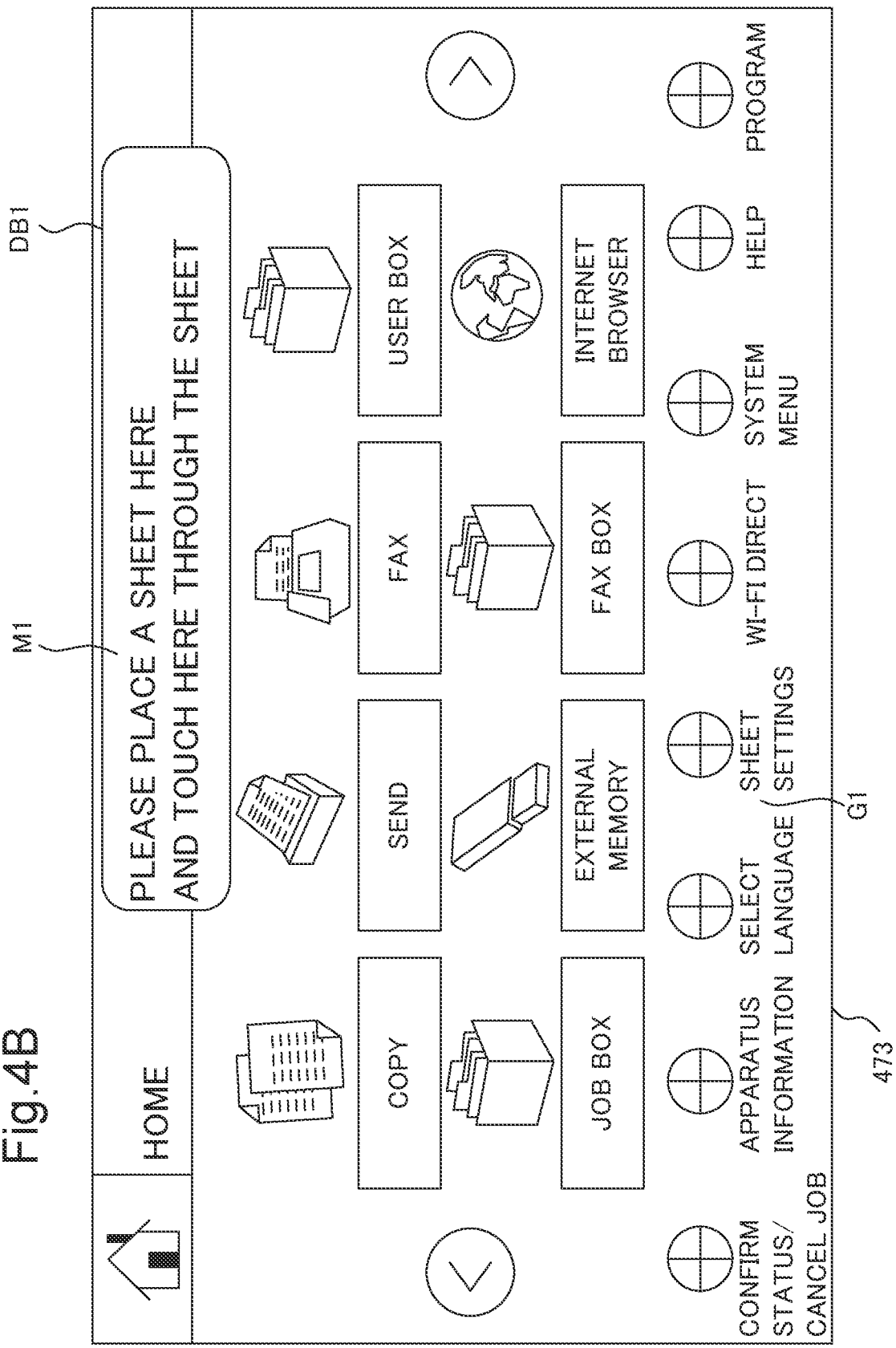

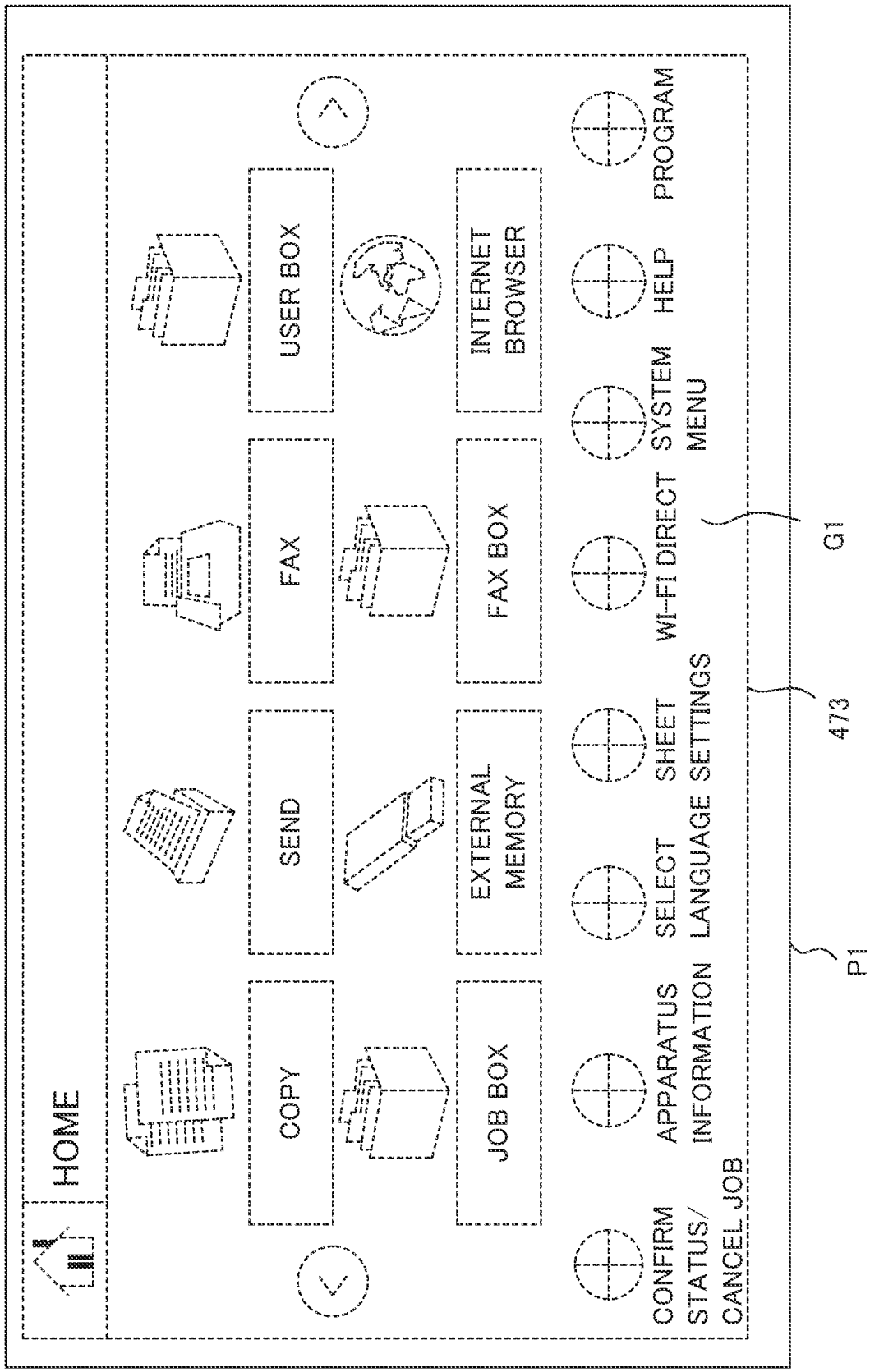

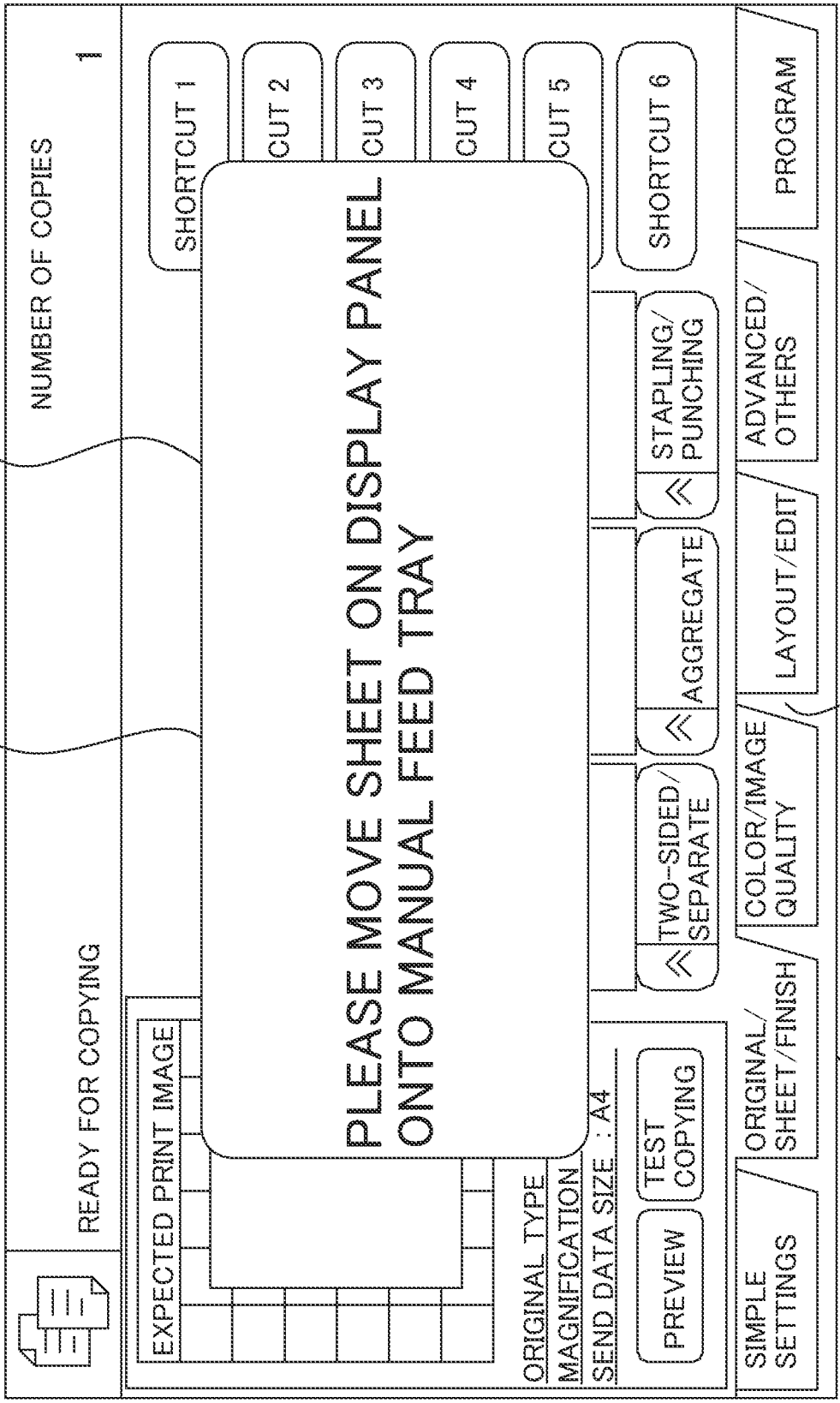

IMAGE FORMING APPARATUS CAPABLE OF CONTROLLING SHEET DISCHARGE ACCORDING TO PRESENCE OR ABSENCE OF USER

INCORPORATION BY REFERENCE

This application claims priority to Japanese Patent Application No. 2021-055935 filed on 29 Mar. 2021, the entire contents of which are incorporated by reference herein.

BACKGROUND

The present disclosure relates to image forming apparatuses having touch panel function.

An image forming apparatus having touch panel function is known. For example, a first technique is generally known for changing the sensitivity of a touch panel to enable a touch gesture by proximity to the touch panel without touching the touch panel with a finger. For another example, a second technique is known for changing the sensitivity of a touch panel to enable even sensing of a gloved finger touch, like an ungloved finger touch.

SUMMARY

A technique improved over the aforementioned techniques is proposed as one aspect of the present disclosure.

An image forming apparatus according to an aspect of the present disclosure includes a document reading device, a sheet feed device, an image forming device, a sheet output tray, a conveyance device, a display device, a touch panel, and a control device. The document reading device reads an image of an original document and generates image data representing the document image. The sheet feed device feeds a sheet. The image forming device forms an image on the sheet to make a printed matter. The conveyance device conveys the sheet from the sheet feed device via the image forming device to the sheet output tray. The touch panel is laid over the display device. The control device includes a processor and functions, through the processor executing a control program, as a controller and a user presence/absence determiner. When accepting an instruction to execute a print job through the touch panel, the controller controls operations of the sheet feed device, the conveyance device, and the image forming device to allow the document image represented by the image data generated by the document reading device to be formed on the sheet to make the printed matter and allow the printed matter to be discharged to the sheet output tray. The user presence/absence determiner determines whether a user of the image forming apparatus is present or absent. When the user presence/absence determiner determines that the user is present, the controller controls, before printing for at least a last sheet in the print job, the operations of the sheet feed device and the conveyance device to allow a sheet to be discharged to the sheet output tray without allowing the image forming device to form the document image on the sheet.

BRIEF DESCRIPTION OF THE DRAWINGS

FIG. 2 is a functional block diagram schematically showing an essential internal configuration of the image forming apparatus.

FIG. 3B is a flowchart showing the remaining portion of the example of sheet discharge processing.

FIG. 4A is a view showing an example of a first message.

FIG. 4B is a view showing another example of the first message.

FIG. 5A is a view showing an example of a state of display before the brightness and contrast of display are adjusted.

FIG. 6 is a view showing an example of a second message.

DETAILED DESCRIPTION

Figure 1:
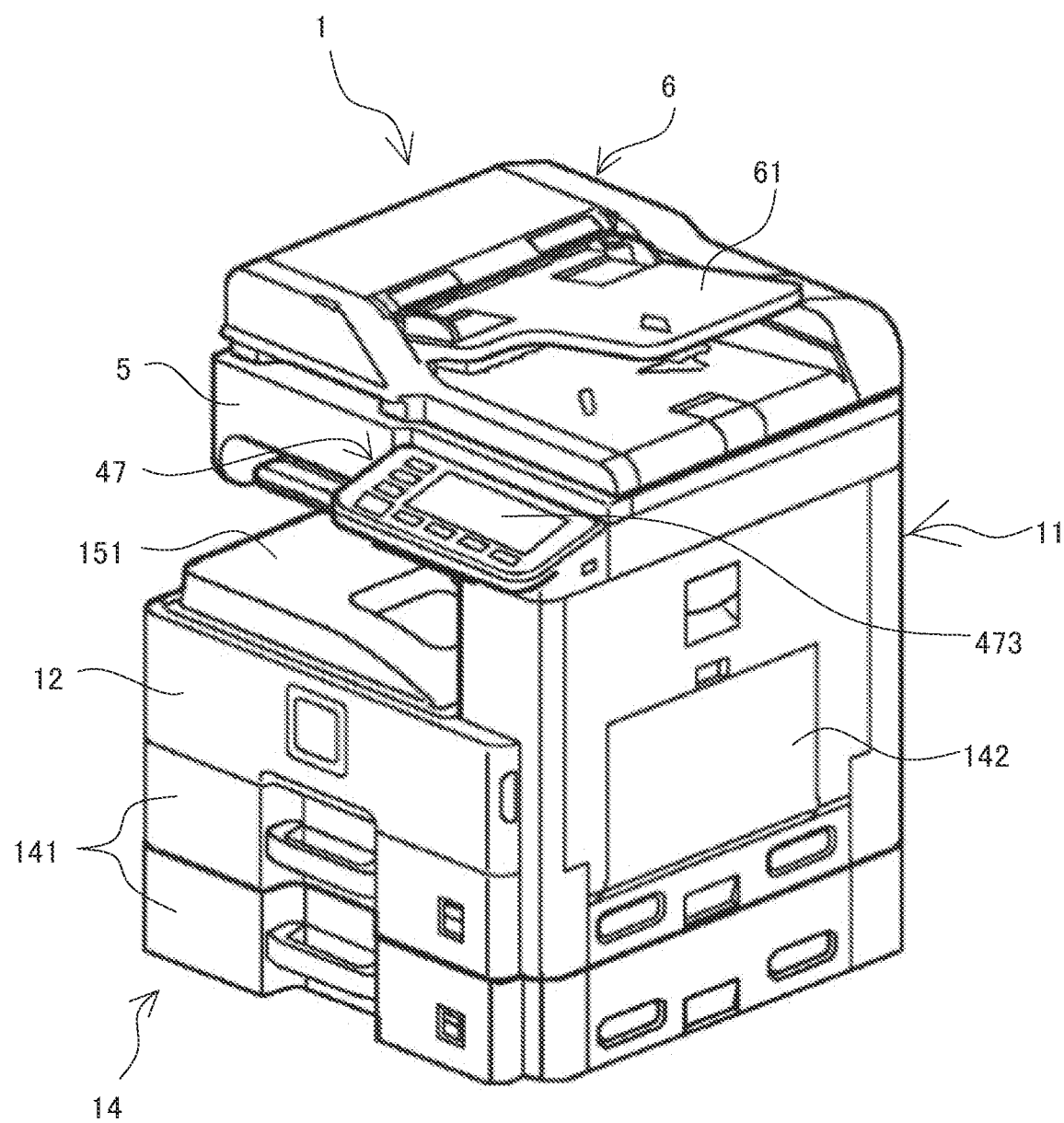
FIG. 1 is a perspective view showing the appearance of an image forming apparatus according to one embodiment of the present disclosure.

Hereinafter, a description will be given of an image forming apparatus according to an embodiment of the present disclosure with reference to the drawings. FIG. 1 is a perspective view showing the appearance of an image forming apparatus 1 according to an embodiment of the present disclosure. FIG. 2 is a functional block diagram schematically showing an essential internal configuration of the image forming apparatus 1.

The image forming apparatus 1 is, for example, a multi-function peripheral having multiple functions, such as a copy function, a print function, a scan function, and a facsimile function. The image forming apparatus 1 has an apparatus body 11 and the apparatus body 11 contains a control device 10, a document feed device 6, a document reading device 5, an image forming device 12, a fixing device 13, a sheet feed device 14, a conveyance device 19, a storage device 8, an operation device 47, a human detection sensor 31, an opening/closing sensor 32, a document detection sensor 33, a first sheet detection sensor 34, and a second sheet detection sensor 35.

The document feed device 6 is mounted by hinges or the like on the top surface of the document reading device 5 and is thus openable and closable relative to the document reading device 5. The document feed device 6 functions as a document holding cover in reading an original document placed on a platen glass. The document feed device 6 is an ADF (auto document feeder). The document feed device 6 includes a document loading tray 61. The document feed device 6 feeds original documents loaded onto the document loading tray 61 to the document reading device 5 one by one.

The document feed device 6 is designed so that, after reading of an image on the front side of an original document by the document reading device 5, it can mechanically turn over the original document and feed the original document to the document reading device 5 again. Thus, the document feed device 6 enables the document reading device 5 to read both sides of the original document.

First, a description will be given of the case where a document reading operation is performed on the image forming apparatus 1. The document reading device 5 optically reads an image of an original document fed to the document reading device 5 by the document feed device 6 or an image of an original document placed on a platen glass and generates image data representing the document image. The image data generated by the document reading device 5 is saved in an image memory or the like.

Next, a description will be given of the case where an image forming operation is performed on the image forming apparatus 1. Based on image data generated by the document reading device 5, image data stored in the image memory or the like or image data received from a computer connected via a network, the image forming device 12 forms a toner image on a sheet fed from the sheet feed device 14 and being conveyed by the conveyance device 19, thus making a printed matter.

The fixing device 13 applies heat and pressure to the sheet with the toner image formed thereon by the image forming device 12 to fix the toner image on the sheet. The sheet subjected to the fixation processing is discharged onto a sheet output tray 151. The sheet feed device 14 feeds a sheet. The sheet feed device 14 includes a plurality of sheet feed cassettes 141. The conveyance device 19 has a conveyance path for use in conveying the sheet from the sheet feed device 14 via the image forming device 15 to the sheet output tray 151. The conveyance device 19 conveys the sheet along the conveyance path.

A manual feed tray 142 is provided in a side surface of the apparatus body 11 and is openable and closable relative to the apparatus body 11. A sheet placed on the manual feed tray 142 is fed to the conveyance path of the conveyance device 19 by the sheet feed device 14.

The storage device 8 is a large storage device, such as an HDD (hard disk drive) or an SSD (solid state drive). The storage device 8 stores various types of control programs.

The operation device 47 accepts user's instructions for various types of operations and processing executable by the image forming apparatus 1, such as an instruction to execute an image forming operation. The operation device 47 includes a display device 473 that displays operation guidance and other types of information for the user. The operation device 47 accepts a user's instruction that a touch panel 474 provided on the display device 473 detects based on a touch gesture made on the display device 473.

The display device 473 is formed of a liquid crystal display (LCD) or the like. The touch panel 474 is laid over the display device 473. When the user makes a touch gesture on a button or key displayed on the display device 473, the touch panel 474 accepts an instruction associated with a point where the touch gesture has been made.

The human detection sensor 31 detects proximity of a person to the image forming apparatus 1. Examples of the human detection sensor 31 that can be used include an infrared sensor capable of detecting infrared rays emitted from a human body, and an ultrasonic sensor. The human detection sensor 31 outputs to the control device 10 a signal indicating a detection result.

The opening/closing sensor 32 is provided in the document reading device 5. The opening/closing sensor 32 detects the opening and closing of the document feed device 6 functioning as a document holding cover. The opening/closing sensor 32 outputs to the control device 10 a signal indicating a detection result. The opening/closing sensor 32 is, for example, a mechanical switching mechanism.

The document detection sensor 33 detects an original document loaded onto the document loading tray 61. The first sheet detection sensor 34 detects a sheet placed on the display device 473. The second sheet detection sensor 35 detects a sheet placed on the opened manual feed tray 142. The document detection sensor 33, the first sheet detection sensor 34, and the second sheet detection sensor 35 output to the control device 10 respective signals indicating detection results. An example of each of these detection sensors that can be used is a reflective sensor including a light-emitting element and a light-receiving element.

The control device 10 includes a processor, a RAM (random access memory), a ROM (read only memory), and a dedicated hardware circuit. The processor is, for example, a CPU (central processing unit), an ASIC (application specific integrated circuit) or an MPU (micro processing unit). When a control program stored in the above ROM or the storage device 8 is executed by the above processor, the control device 10 functions as a controller 100 and a user presence/absence determiner 101.

The controller 100 governs the overall operation control of the image forming apparatus 1. The controller 100 is connected to the document feed device 6, the document reading device 5, the image forming device 12, the fixing device 13, the sheet feed device 14, the conveyance device 19, the storage device 8, the operation device 47, the human detection sensor 31, the opening/closing sensor 32, the document detection sensor 33, the first sheet detection sensor 34, and the second sheet detection sensor 35 and controls the operations and so on of these components.

For example, based on an instruction to execute a print job accepted by the touch panel 474, the controller 100 controls the operations of the sheet feed device 14, the conveyance device 19, the image forming device 12, and so on to allow a document image represented by image data generated by the document reading device 5 to be formed on a sheet to make a printed matter and allow the printed matter to be discharged to the sheet output tray 151.

The user presence/absence determiner 101 determines the presence or absence of a user of the image forming apparatus 1. The user presence/absence determiner 101 determines that a user of the image forming apparatus 1 is present, for example, (i) when a person is present around the image forming apparatus 1, (ii) when an original document to be scanned (an original document to be read by the document reading device 5) is present or (iii) when a person is present around the image forming apparatus 1 and an original document to be scanned is present.

The user presence/absence determiner 101 determines whether a person is present or absent around the image forming apparatus 1, based on a detection result of the human detection sensor 31. The user presence/absence determiner 101 determines whether an original document (an original document to be scanned) is present or absent on the document loading tray 61, based on a detection result of the document detection sensor 33.

In placing an original document on the platen glass, the user performs a series of actions to open the document feed device 6 functioning as the document holding cover, place an original document on the platen glass, and close the document feed device 6.

Therefore, when the document feed device 6 is opened and then closed, it can be assumed that an original document has been placed on the platen glass. Hence, the user presence/absence determiner 101 determines whether an original document (an original document to be scanned) is present or absent on the platen glass, based on a detection result of the opening/closing sensor 32.

When, before and/or after the start of execution of a print job, the user presence/absence determiner 101 determines that a user of the image forming apparatus 1 is present, the controller 100 controls, before printing for at least a last sheet in the print job, the operations of the sheet feed device 14 and the conveyance device 19 to allow a sheet with no document image formed thereon to be discharged to the sheet output tray 151.

Next, a description will be given of an example of sheet discharge processing of the image forming apparatus 1 according to this embodiment, with reference to the flowchart shown in FIGS. 3A and 3B. The sheet discharge processing is executed when a special mode for enabling a "non-contact touch gesture" as a feature of the present disclosure is selected.

The user presence/absence determiner 101 determines whether a user of the image forming apparatus 1 is present or absent (step S1). When the user presence/absence determiner 101 determines that a user of the image forming apparatus 1 is present (YES in step S1), the controller 100 controls the operations of the sheet feed device 14 and the conveyance device 19 to allow only one sheet to be discharged to the sheet output tray 151, without allowing the image forming device 12 to form an image on the sheet (step S2). It is sufficient that the number of sheets to be discharged is one, but two or more sheets may be discharged.

The controller 100 allows the display device 473 to display a first message prompting the user to move the sheet discharged to the sheet output tray 151 onto the top of the display device 473 and additionally indirectly touch the display device 473 through the sheet (step S3). FIG. 4A is a view showing an example of a first message which the controller 100 allows the display device 473 to display. An operation screen G1 shown in FIG. 4A is a home screen which the display device 473 is displaying under the control of the controller 100. The controller 100 allows the display device 473 to display a dialog box DB1 containing a first message M1 "PLEASE PLACE A SHEET HERE AND TOUCH HERE THROUGH THE SHEET" on the operation screen G1.

The controller 100 determines whether or not the touch panel 474 has accepted a touch gesture toward the display device 473 (step S4). When determining that the touch panel 474 has accepted a touch gesture (YES in step S4), the controller 100 allows the display device 473 to hide the dialog box DB1 (i.e., the first message M1) (step S5).

In step S3, for example, as shown in FIG. 4B, the controller 100 may allow the display device 473 to display the dialog box DB1 outside a region of the operation screen G1 where images representing buttons for accepting instructions and messages for operation guidance are shown. In this case, the controller 100 may not necessarily execute the processing in step S5. The reason for this is that even if the dialog box DB1 (the first message M1) is not hidden, the user has no problem operating the buttons for accepting instructions.

The controller 100 performs, as predetermined processing for increasing the visibility of the display of the display device 473, adjustment of the brightness and contrast of the display of the display device 473 (step S6). For example, the controller 100 increases the brightness and contrast of the display of the display device 473 to their maximum values.

Figure 5B:
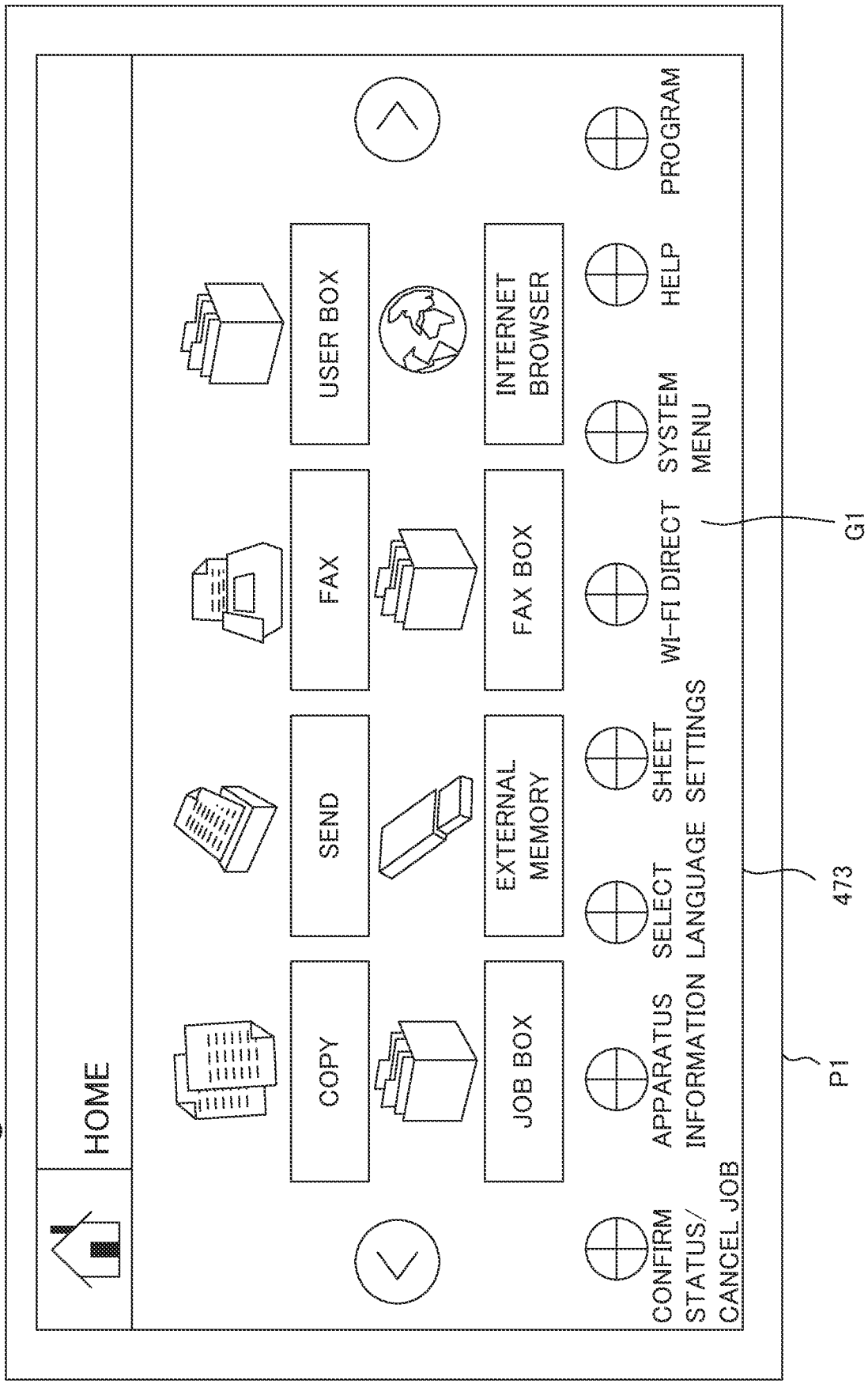
FIG. 5B is a view showing an example of a state of the display after the brightness and contrast of display are adjusted.

FIG. 5A is a view showing a state of the display as the sheet P1 is placed on the display device 473 and before the brightness and contrast of the display are adjusted. FIG. 5B is a view showing a state of the display as the sheet P1 is placed on the display device 473 and after the brightness and contrast of the display have been adjusted. By adjusting the brightness and contrast of the display of the display device 473, the image of the operation screen G1 can be made sharp even when the sheet P1 is placed on the display device 473. Therefore, the user can easily visually recognize the operation screen G1.

When, in step S4, determining that the touch panel 474 has not accepted any touch gesture (NO in step S4), the controller 100 determines, based on a detection signal output from the human detection sensor 31, whether a person is present or absent around the image forming apparatus 1 (step S7).

When determining that a person is present around the image forming apparatus 1 (YES in step S7), the controller 100 goes back to the processing in step S4. On the other hand, when determining that no person is present around the image forming apparatus 1 (NO in step S7), the controller 100 allows the display device 473 to hide the dialog box DB1 (i.e., the first message M1) (step S8). After the processing in step S8, the controller 100 ends the sheet discharge processing.

After the processing in step S6, the controller 100 determines whether or not the touch panel 474 has accepted a user's instruction (step S9). When determining that the touch panel 474 has accepted a user's instruction (YES in step S9), the controller 100 determines whether or not the user's instruction is an instruction to execute a print job (step S10).

When determining that the user's instruction is not an instruction to execute a print job (NO in step S10), the controller 100 executes processing based on the user's instruction (step S11). After the processing in step S11, the controller 100 determines, based on a detection signal output from the human detection sensor 31, whether a person is present or absent around the image forming apparatus 1 (step S12).

When determining that a person is present around the image forming apparatus 1 (YES in step S12), the controller 100 goes back to the processing in step S9. On the other hand, when determining that no person is present around the image forming apparatus 1 (NO in step S12), the controller 100 restores the brightness and contrast of the display of the display device 473 to their former values (step S13). After the processing in step S13, the controller 100 ends the sheet discharge processing.

When determining that the touch panel 474 has not accepted any user's instruction (NO in step S9), the controller 100 goes to the processing in step S12.

When determining that the user's instruction accepted by the touch panel 474 is an instruction to execute a print job (YES in step S10), the controller 100 determines whether or not the number of sheets planned for printing in the print job instructed to execute by the user is one (step S21). When the number of original documents for printing is one and the number of print copies is set at one, the controller 100 determines that the number of sheets planned for printing is one.

When determining that the number of sheets planned for printing is not one (NO ins step S21), the controller 100 controls the operations of the sheet feed device 14, the conveyance device 19, the image forming device 12, and so on to execute printing based on the user's instruction (step S22). When determining that the next sheet is the last sheet for printing (YES in step S23), the controller 100 suspends the making of a printed matter (step S24) and allows the display device 473 to display a second message prompting the user to move the sheet being placed on the display device 473 (i.e., the sheet discharged with no document image formed thereon) onto the manual feed tray 142 (step S25).

FIG. 6 is a view showing an example of a second message which the controller 100 allows the display device 473 to display. An operation screen G2 shown in FIG. 6 is a copy screen which the display device 473 is displaying under the control of the controller 100. The controller 100 allows the display device 473 to display a dialog box DB2 containing a second message M2 "PLEASE MOVE SHEET ON DISPLAY PANEL ONTO MANUAL FEED TRAY" on the operation screen G2.

The controller 100 determines, based on a detection signal output from the second sheet detection sensor 35, whether or not a sheet is placed on the manual feed tray 142 (step S26).

When determining that a sheet is placed on the manual feed tray 142 (YES in step S26), the controller 100 allows the display device 473 to hide the dialog box DB2 (the second message M2) (step S27) and restores the brightness and contrast of the display of the display device 473 to their former values (step S28). The controller 100 controls the operations of the sheet feed device 14, the conveyance device 19, and the image forming device 12 to execute printing using the sheet placed on the manual feed tray 142 as the last sheet in the print job (step S29). After the processing in step S29, the controller 100 ends the sheet discharge processing.

When determining that the number of sheets planned for printing is one (YES ins step S21), the controller 100 goes to the processing in step S25.

Image forming apparatuses, such as copiers or multifunction peripherals, are placed in offices or commercial facilities and often shared by a plurality of persons. Most image forming apparatuses are equipped with a display device having touch panel function. Therefore, users generally make operations of touching the display device. If a large number of unspecified people use an image forming apparatus, some users may want to avoid inadvertent touch on the touch panel for sanitary reasons. Therefore, a technique enabling users to operate an image forming apparatus without touching the display device is desirable. The previously described, generally known, first and second techniques need to change the sensitivity of the touch panel in order to reduce the number of touches on the touch panel by the users. However, in order to change the sensitivity of the touch panel, the apparatus need to be enhanced in capability and may be structurally complicated.

By placing a sheet on the screen of the display device 473 and making a touch gesture through the sheet toward the display device 473, a non-contact touch gesture can be realized without having to use the above techniques. Since, in the above embodiment, a sheet for a touch gesture is discharged to the sheet output tray 151 when a user of the image forming apparatus 1 is determined to be present, the user can easily obtain the sheet for realizing a non-contact touch gesture. Therefore, the above embodiment can easily realize a non-contact touch gesture without incurring the need to enhance the apparatus capability and structural complication of the apparatus.

Additionally, in the above embodiment, the brightness and contrast of the display of the display device 473 are adjusted to increase the visibility. As a result, even when a sheet is placed on the display device 473, the user can visually clearly recognize the operation screen.

In the above embodiment, printing for the last sheet in a print job is performed using a sheet placed on the manual feed tray 142. Therefore, by moving the sheet having been placed on the display device 473 and used for realization of a non-contact touch gesture onto the manual feed tray 142, a waste of sheet can be prevented.

Although in the above embodiment the controller 100 adjusts both the brightness and contrast of the display of the display device 473 in order to increase the visibility of the display, only one of the brightness and contrast may be adjusted.

In the above embodiment, the controller 100 adjusts the brightness and contrast of the display of the display device 473 when a sheet with no document image formed thereon is discharged and, then, the touch panel 474 accepts a touch gesture toward the display device 473. However, the present disclosure is not limited to the manner described in the above embodiment. For example, when a sheet with no document image formed thereon is discharged and, then, the first sheet detection sensor 34 detects a sheet being placed on the display device 473, the controller 100 may adjust the brightness and contrast of the display of the display device 473.

Figure 3A:
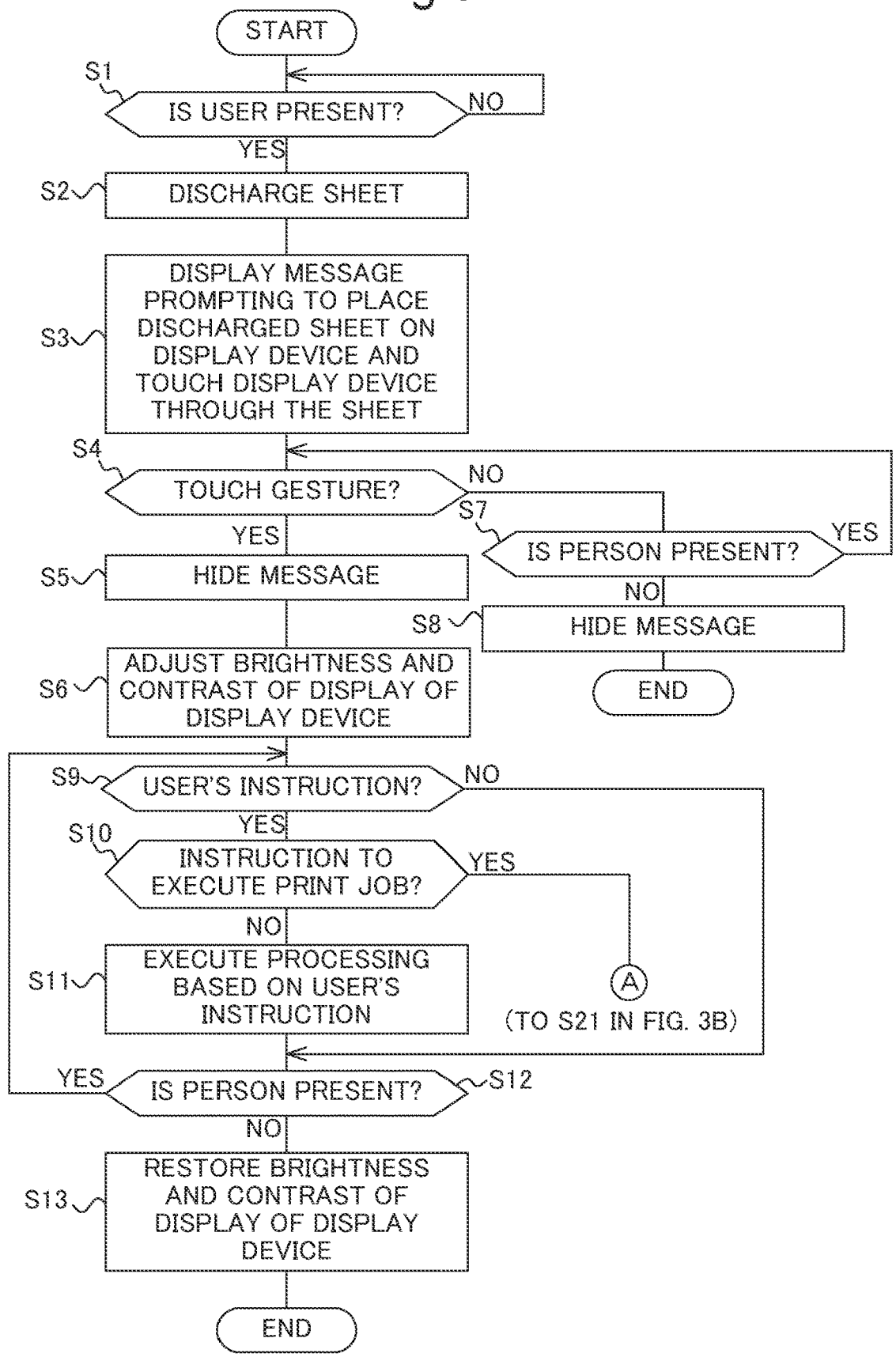
FIG. 3A is a flowchart showing a portion of an example of sheet discharge processing.
Figure 7:
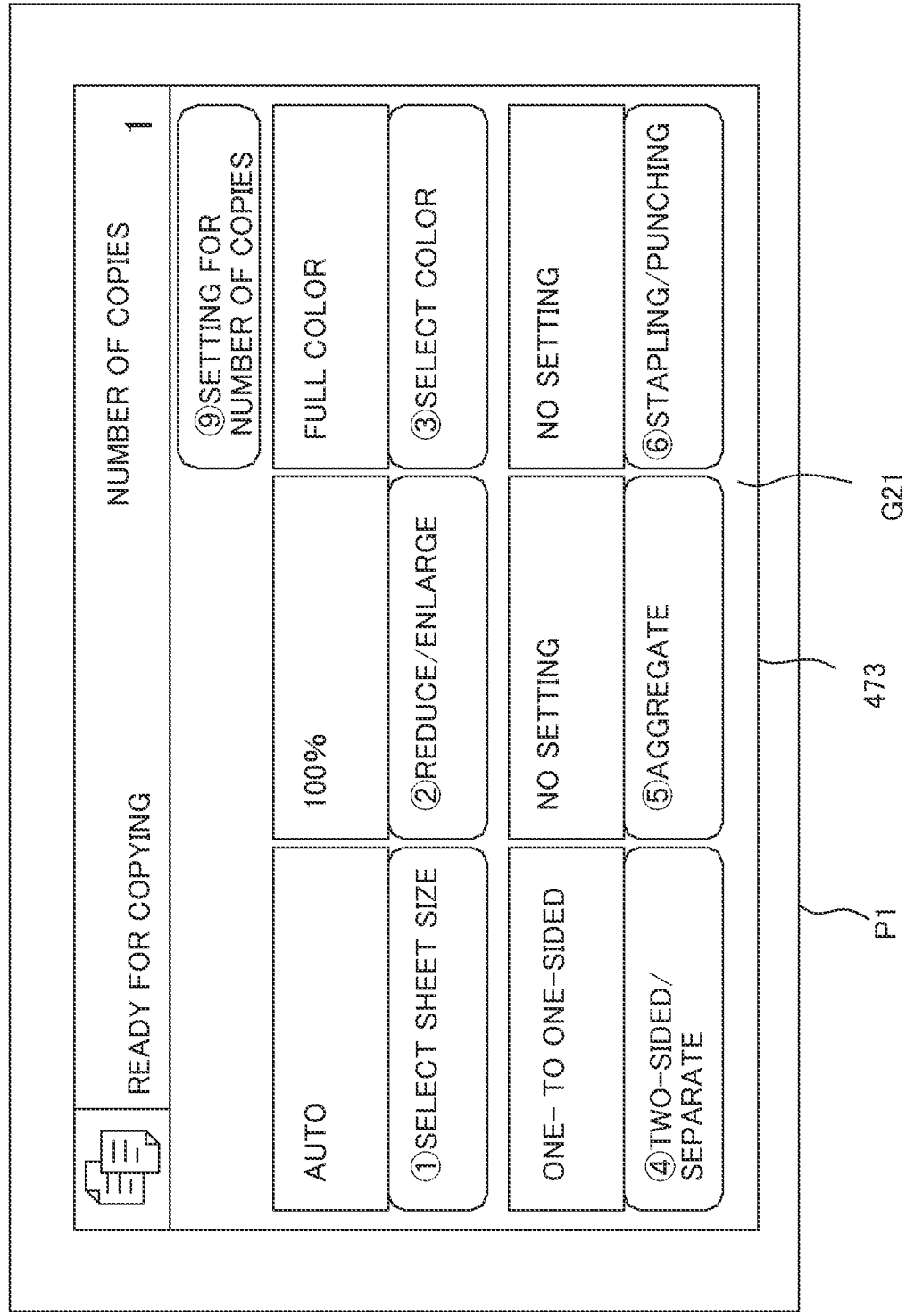
FIG. 7 is a view showing an example of an operation screen in a universal mode.

In another embodiment of the present disclosure, in step S6 of the sheet discharge processing shown in FIG. 3A, the controller 100 may further execute processing for switching the display of the display device 473 from the display in a normal mode to the display in a universal mode providing greater visibility. Thus, the visibility of the display of the display device 473 can be further increased. FIG. 7 is a view of an image showing a state where the display device 473 is displaying an operation screen in a universal mode under the control of the controller 100. An operation screen G21 shown in FIG. 7 is a copy screen in the universal mode.

The present disclosure is not limited to the above embodiments and can be modified in various ways. Although in the above embodiments a multifunction peripheral is used as an embodiment of the image forming apparatus according to the present disclosure, the multifunction peripheral is merely illustrative and, for example, other image forming apparatuses having a copy function or a print function may be used.

The structure, configuration, and processing described with reference to FIGS. 1 to 7 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:
1. An image forming apparatus comprising:
a document reading device that reads an image of an original document and generates image data representing the document image;
a sheet feed device that feeds a sheet;
an image forming device that forms an image on the sheet to make a printed matter;
a sheet output tray;
a conveyance device that conveys the sheet from the sheet feed device via the image forming device to the sheet output tray;
a display device;
a touch panel laid over the display device; and
a control device including a processor and functioning, through the processor executing a control program, as
a controller that, upon acceptance of an instruction to execute a print job through the touch panel, controls operations of the sheet feed device, the conveyance device, and the image forming device to allow the document image represented by the image data generated by the document reading device to be formed on the sheet to make the printed matter and allow the printed matter to be discharged to the sheet output tray, and
a user presence/absence determiner that determines whether a user of the image forming apparatus is present or absent, wherein when the user presence/absence determiner determines that the user is present, the controller controls, before printing for at least a last sheet in the print job, the operations of the sheet feed device and the conveyance device to allow a sheet to be discharged to the sheet output tray without allowing the image forming device to form the document image on the sheet.

2. The image forming apparatus according to claim 1, wherein the controller controls the operations of the sheet feed device and the conveyance device to allow only one sheet with no document image formed thereon to be discharged to the sheet output tray.

3. The image forming apparatus according to claim 1, further comprising:
   a human detection sensor that detects a person present around the image forming apparatus; and
   a document detection sensor that detects the original document to be read by the document reading device,
   wherein when the human detection sensor detects the person and the document detection sensor detects the original document, the user presence/absence determiner determines that the user is present.

4. The image forming apparatus according to claim 1, wherein when the user presence/absence determiner determines that the user is present, the controller further executes adjustment processing for adjusting at least one of brightness and contrast of display of the display device.

5. The image forming apparatus according to claim 4, wherein the controller executes, together with the adjustment processing, switching processing for switching the display of the display device from display in a normal mode to display in a universal mode providing greater visibility.

6. The image forming apparatus according to claim 4, wherein when the sheet with no document image formed thereon is discharged and the touch panel then accepts a touch gesture toward the display device, the controller executes the adjustment processing.

7. The image forming apparatus according to claim 4, further comprising a first sheet detection sensor that detects the sheet placed on the display device,
   wherein when the sheet with no document image formed thereon is discharged and the first sheet detection sensor then detects the sheet placed on the display device, the controller executes the adjustment processing.

8. The image forming apparatus according to claim 1, further comprising a sheet feed cassette and a manual feed tray,
   wherein the sheet feed device feeds the sheet placed in the sheet feed cassette or on the manual feed tray, and
   when the sheet with no document image formed thereon is discharged, the controller controls the operations of the sheet feed device, the conveyance device, and the image forming device to allow the printing for the at least last sheet in the print job to be performed using the sheet being placed on the manual feed tray.

9. The image forming apparatus according to claim 8, further comprising a second sheet detection sensor that detects the sheet placed on the manual feed tray,
   wherein when a time for printing for the last sheet in the print job comes, the controller suspends making of the printed matter, and then when the second sheet detection sensor detects the sheet placed on the manual feed tray, the controller restarts the making of the printed matter.

10. The image forming apparatus according to claim 1, wherein the controller discharges the sheet with no document image formed thereon and allows the display device to display a first massage prompting to place the discharged sheet on the display device.

11. The image forming apparatus according to claim 1, wherein when a time for printing for the last sheet in the print job comes, the controller allows the display device to display a second message prompting to move the discharged sheet with no document image formed thereon onto the manual feed tray.

\* \* \* \* \*